United States Patent
Hicks, III (10) Patent No.: US 8,600,382 B2
(45) Date of Patent: Dec. 3, 2013

(54) APPARATUS AND METHOD FOR MEASUREMENT-BASED MEDIUM SELECTION IN A NETWORK

(75) Inventor: John Alson Hicks, III, Roswell, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 795 days.

(21) Appl. No.: 12/429,901

(22) Filed: Apr. 24, 2009

(65) Prior Publication Data

US 2010/0272010 A1 Oct. 28, 2010

(51) Int. Cl.
*H04W 4/00* (2009.01)
*H04W 36/00* (2009.01)
*H04M 3/00* (2006.01)
*H04L 12/28* (2006.01)
*G06F 15/16* (2006.01)
*H04N 7/173* (2011.01)
*H04N 7/16* (2011.01)

(52) U.S. Cl.
USPC ........ 455/435.2; 725/105; 725/110; 725/120; 725/121; 725/122; 725/123; 725/151; 709/227; 709/228; 709/229; 455/435.1; 455/435.3; 455/420; 455/436; 370/431; 370/331

(58) Field of Classification Search
USPC ........................................................ 705/151
See application file for complete search history.

(56) References Cited

U.S. PATENT DOCUMENTS

| | | | |
|---|---|---|---|
| 5,390,233 A | 2/1995 | Jensen et al. | |
| 2007/0153815 A1 | 7/2007 | She et al. | |
| 2009/0037382 A1* | 2/2009 | Ansari et al. | ..... 707/3 |

OTHER PUBLICATIONS

White Paper: "Inter-MAC concept for Gbps Home Network" Author(s): Martial Bellec, Jean-Philippe Javaudin, Andreas Foglar, Oliver Hoffmann, Pierre Jaffré, Olivier Isson Published: Apr. 9, 2009.*
Technology Convergence for future Home Networks (IEEE) authored by Jean-Philippe Javaudin and Martial Bellec; Issued Nov. 24-27, 2008.*
ITU-T NewsLog: New Global Standard for Fully Networked Home; published Dec. 12, 2008.*
Deliverable D1.1; Final Usage Scenarios Report Author(s): Sylvain Meyer, Jean-Philippe Javaudin, Dimitris Varoutas, Silke Rebernig, Gilles Goni, Evangelos Karathanos, Enrique Fernández Published: Sep. 30, 2008.*
Homeplug Powerline Alliance, "Powerline Networking The HomePlug Experience", pp. 1, http://www.homeplug.org/products, Web Site last visited Apr. 23, 2009.

* cited by examiner

*Primary Examiner* — Dwayne Bost
*Assistant Examiner* — Nalini Mummalaneni
(74) *Attorney, Agent, or Firm* — Ralph Trementozzi; Guntin & Gust, PLC (57) ABSTRACT

A system that incorporates teachings of the present disclosure may include, for example, a media gateway establishing communications with a set-top box over a wireline network according to a next generation home network protocol, and over a wireless network according to a wireless network (e.g., Wi-Fi™) protocol. The media gateway measures a quality of service (e.g., latency, jitter, packet loss) and/or bandwidth for communications with the set-top box over the wireless and wireline networks. The media gateway compares the measured parameters against service provider requirements for the set-top box, and determines a network to be used by the set-top box. The media gateway can also consider the quality of service and/or bandwidth of other media devices on the networks to switch the set-top box and the devices among the available networks. The switching can be limited to avoid excessive switching between the networks. Other embodiments are disclosed.

25 Claims, 5 Drawing Sheets

Communication Devices

APPARATUS AND METHOD FOR MEASUREMENT-BASED MEDIUM SELECTION IN A NETWORK

FIELD OF THE DISCLOSURE

The present disclosure relates generally to communication devices and more specifically to an apparatus for exchanging media content.

BACKGROUND

It is common today for media devices such as computers, gaming consoles and other web-enabled devices to communicate over the Internet over a wireless access point operating according to a Wireless Fidelity communications protocol often referred to as WIFI™ or a derivative of one of the 802.11 protocols. Although WIFI™ communications has become very popular because of its flexibility in connecting multiple devices in a dwelling, it can be unstable due to interference from WIFI™ access points of neighbors operating on the same or a proximate channel, interference from cordless phones operating on the same or a proximate frequency band, and interference from the layout of the dwelling.

Wireline technologies such as Ethernet communications can overcome some of the interference issues with WIFI™. However, wireline Ethernet communications typically requires a combination of a modem and a router with Ethernet ports to provide wireline access to Ethernet capable devices. Connecting directly to the router restricts mobility and location of these devices which is a tradeoff over WIFI™ communications. To work around the mobility issue, technology is available to perform Ethernet communication over power lines. This technology, however, can still suffer from interference issues created by undesirable network power topology in a home, or from devices that add noise to power lines when turned on.

DETAILED DESCRIPTION

An embodiment of the present disclosure can entail a set-top box (STB) operable in a building a wireline transceiver communicatively coupled to a media gateway over a wireline network according to a next generation home network (G.hn) protocol, wherein the media gateway supplies media services to the STB by way of an interactive television (iTV) network communicatively coupled to the media gateway, a wireless transceiver communicatively coupled to the media gateway over a wireless network according to a wireless fidelity (WIFI™) protocol, and a controller coupled to the wireline and wireless transceivers. The controller can be operable to determine a first measure of communication according to at least one of a first quality of service (QoS) measure and a first capacity of communication with the media gateway according to the WIFI™ protocol, determine a second measure of communication according to at least one of a second QoS measure and a second capacity of communication with the media gateway according to the G.hn protocol, and coordinate with the media gateway to select one of the wireline network and the wireless network according to the first and second measures of communication to deliver media content supplied by the iTV network.

An embodiment of the present disclosure can entail a computer-readable storage medium having computer instructions to establish communications with a media gateway over a wireline network according to a G.hn protocol, establish communications with the media gateway over a wireless network according to a WIFI™ protocol, determine a first measure of communication according to the WIFI™ protocol, determine a second measure of communication according to the G.hn protocol, and coordinate with the media gateway to select one of the wireline network and the wireless network according to the first and second measures of communication. The media gateway can supply media services by way of a media services network communicatively coupled to the media gateway.

An embodiment of the present disclosure can entail a media gateway having a controller to establish communications with a media processor over a wireline network according to a G.hn protocol, establish communications with the media processor over a wireless network according to a WIFI™ protocol, determine a first measure of communication according to the WIFI™ protocol, determine a second measure of communication according to the G.hn protocol, and coordinate with the media processor to select one of the wireline network and the wireless network according to the first and second measures of communication for delivery of the media services to the media processor.

Figure 1:
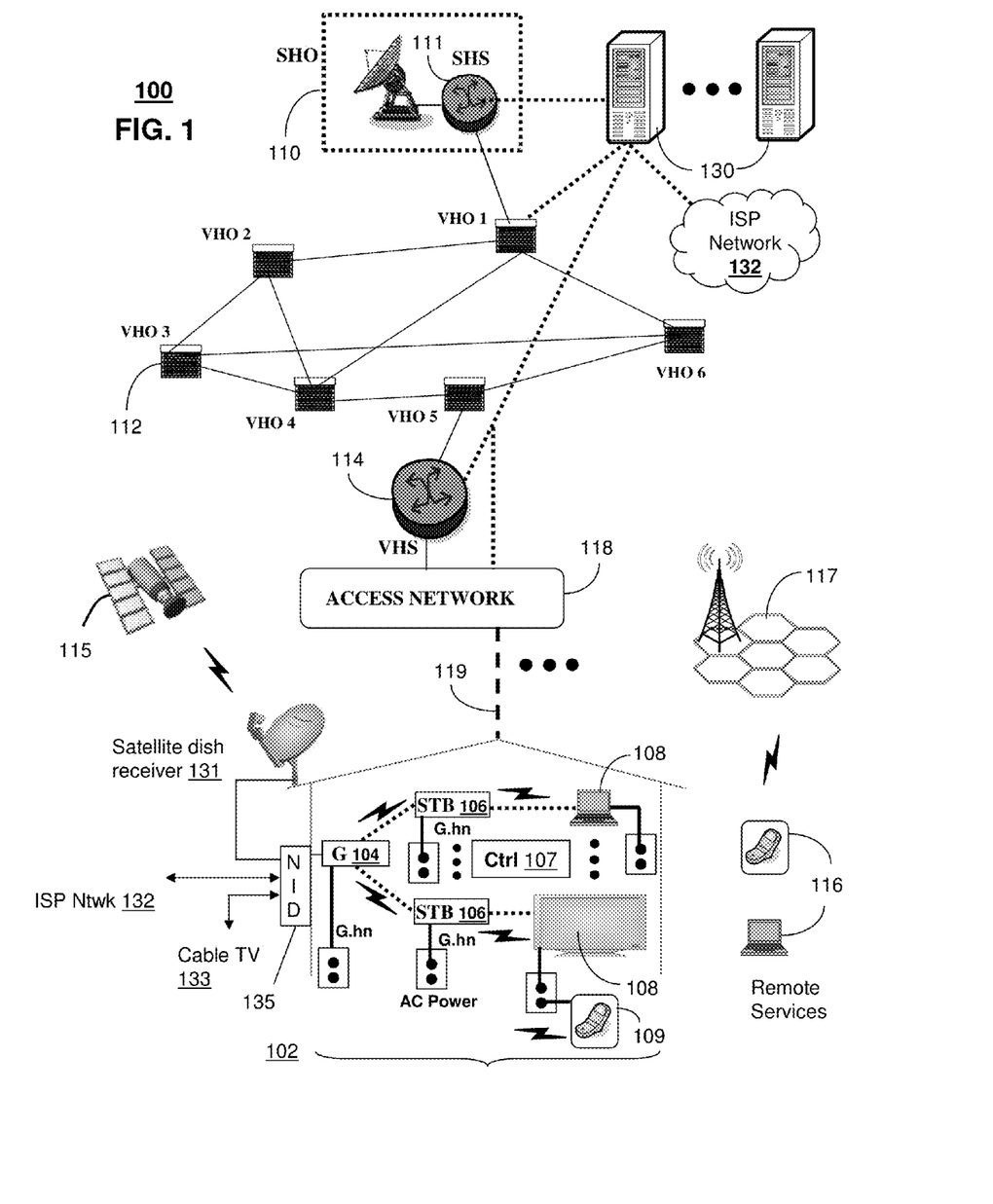
FIGS. 1-2 depict illustrative embodiments of communication systems that provide media services.

FIG. 1 depicts an illustrative embodiment of a first communication system 100 for delivering media content. The communication system 100 can represent an Internet Protocol Television (IPTV) broadcast media system. The IPTV media system can include a super head-end office (SHO) 110 with at least one super headend office server (SHS) 111 which receives media content from satellite and/or terrestrial communication systems. In the present context, media content can represent audio content, moving image content such as videos, still image content, or combinations thereof. The SHS server 111 can forward packets associated with the media content to video head-end servers (VHS) 114 via a network of video head-end offices (VHO) 112 according to a common multicast communication protocol.

The VHS 114 can distribute multimedia broadcast programs via an access network 118 to commercial and/or residential buildings 102 housing a gateway 104 (such as a common residential or commercial gateway). The access network 118 can represent a group of digital subscriber line access multiplexers (DSLAMs) located in a central office or a service area interface that provide broadband services over optical links or copper twisted pairs 119 to buildings 102. The gateway 104 can use common communication technology to distribute broadcast signals to media processors 106 such as Set-Top Boxes (STBs) which in turn present broadcast channels to media devices 108 such as computers, television sets managed in some instances by a media controller 107 (such as an infrared or RF remote control). The gateway 104 can also communicate with voice communication devices such as wired and cordless phones such as phone 109.

In the illustration of FIG. 1, the gateway 104, the media processors 106, the media devices 108, and the phone 109 can be communicatively coupled to each other over tethered interface technologies (such as coaxial, power or phone line wiring) using a next generation home network (G.hn) technology defined by a standard developed by the International Telecommunication Union Telecommunications Standardization Sector (ITU-T) under recommendation G.9960. Future derivatives of the G.hn standard are contemplated by the present disclosure. The gateway 104, the media processors 106, the media devices 108, and phone 109 can also be communicatively coupled to each other over a common wireless access protocol such as a Wireless Fidelity (WIFI™) protocol conforming to any of the family of WIFI™ protocols (e.g., 802.11g, 802.11n and future derivatives) defined by the Institute of Electrical and Electronics Engineers (IEEE).

With either a wireline or wireless interface, unicast communications can be invoked between the media processors 106 and subsystems of the IPTV media system for services such as video-on-demand (VoD), browsing an electronic programming guide (EPG), or other infrastructure services.

Some of the network elements of the IPTV media system can be coupled to one or more computing devices 130 a portion of which can operate as a web server for providing portal services over an Internet Service Provider (ISP) network 132 to the media processors 106 and media devices 108. Media devices 116 can also communicate with the IPTV network of FIG. 1 by way of a wireless access base station 117 operating according to common wireless access protocols such as WIFI™, or cellular communication technologies (such as GSM, CDMA, UMTS, WiMAX, Software Defined Radio or SDR, and so on).

It will be appreciated by an artisan of ordinary skill in the art that a satellite broadcast television system can be used in place of the IPTV media system. In this embodiment, signals transmitted by a satellite 115 supplying media content can be intercepted by a common satellite dish receiver 131 coupled to building 102. Modulated signals intercepted by the satellite dish receiver 131 can be submitted to the media processors 106 for generating broadcast channels which can be presented at the media devices 108. The media processors 106 can be equipped with a broadband port to the ISP network 132 to enable infrastructure services such as VoD and EPG described above.

In yet another embodiment, an analog or digital broadcast distribution system such as cable TV system 133 can be used in place of the IPTV media system described above. In this embodiment the cable TV system 133 can provide Internet, telephony, and interactive media services.

It follows from the above illustrations that the present disclosure can apply to any present or future interactive over-the-air and landline media content services.

Figure 2:
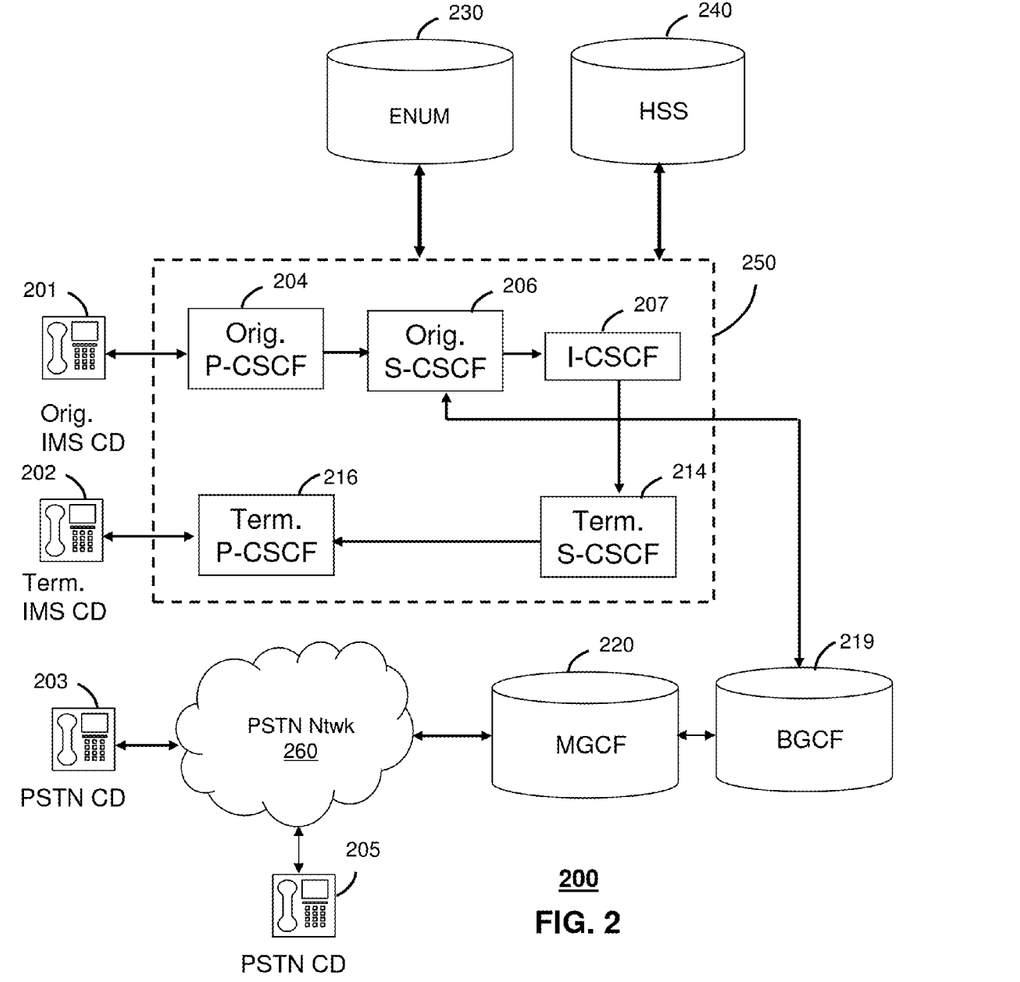

FIG. 2 depicts an illustrative embodiment of a communication system 200 employing an IP Multimedia Subsystem (IMS) network architecture to facilitate the combined services of circuit-switched and packet-switched systems. Communication system 200 can be overlaid or operably coupled with communication system 100 as another representative embodiment of communication system 100.

Communication system 200 can comprise a Home Subscriber Server (HSS) 240, a tElephone NUmber Mapping (ENUM) server 230, and other common network elements of an IMS network 250. The IMS network 250 can establish communications between IMS compliant communication devices (CD) 201, 202, Public Switched Telephone Network (PSTN) CDs 203, 205, and combinations thereof by way of a Media Gateway Control Function (MGCF) 220 coupled to a PSTN network 260.

IMS CDs 201, 202 can register with the IMS network 250 by contacting a Proxy Call Session Control Function (P-CSCF) which communicates with a corresponding Serving CSCF (S-CSCF) to register the CDs with at the HSS 240. To initiate a communication session between CDs, an originating IMS CD 201 can submit a Session Initiation Protocol (SIP INVITE) message to an originating P-CSCF 204 which communicates with a corresponding originating S-CSCF 206. The originating S-CSCF 206 can submit queries to the ENUM system 230 to translate an E.164 telephone number in the SIP INVITE to a SIP Uniform Resource Identifier (URI) if the terminating communication device is IMS compliant.

The SIP URI can be used by an Interrogating CSCF (I-CSCF) 207 to submit a query to the HSS 240 to identify a terminating S-CSCF 214 associated with a terminating IMS CD such as reference 202. Once identified, the I-CSCF 207 can submit the SIP INVITE to the terminating S-CSCF 214. The terminating S-CSCF 214 can then identify a terminating P-CSCF 216 associated with the terminating CD 202. The P-CSCF 216 then signals the CD 202 to establish communications.

If the terminating communication device is instead a PSTN CD such as references 203 or 205, the ENUM system 230 can respond with an unsuccessful address resolution which can cause the originating S-CSCF 206 to forward the call to the MGCF 220 via a Breakout Gateway Control Function (BGCF) 219. The MGCF 220 can then initiate the call to the terminating PSTN CD by common means over the PSTN network 260.

The aforementioned communication process is symmetrical. Accordingly, the terms "originating" and "terminating" in FIG. 2 are interchangeable. It is further noted that communication system 200 can be adapted to support video conferencing by way of common protocols such as H.323. In addition, communication system 200 can be adapted to provide the IMS CDs 201, 203 the multimedia and Internet services of communication system 100.

Figure 3:
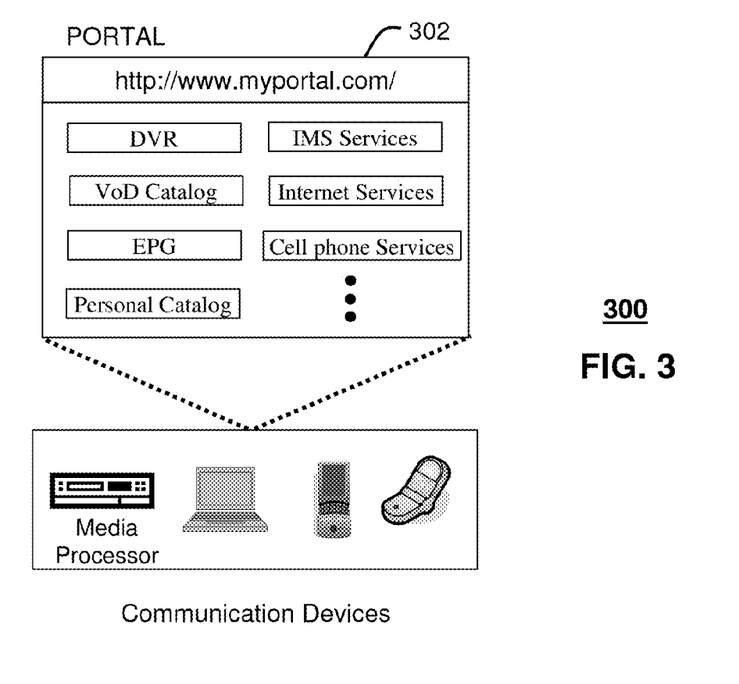
FIG. 3 depicts an illustrative embodiment of a portal interacting with the communication systems of FIGS. 1-2.

FIG. 3 depicts an illustrative embodiment of a portal 302 which can operate from the computing devices 130 described earlier of communication 100 illustrated in FIG. 1. The portal 302 can be used for managing services of communication systems 100-200. The portal 302 can be accessed by a Uniform Resource Locator (URL) with a common Internet browser such as Microsoft's Internet Explorer™ using an Internet-capable communication device such as those described for FIGS. 1-2. The portal 302 can be configured, for example, to access a media processor 106 and services managed thereby such as a Digital Video Recorder (DVR), a VoD catalog, an EPG, a personal catalog (such as personal videos, pictures, audio recordings, etc.) stored in the media processor, provisioning IMS services described earlier, provisioning Internet services, provisioning cellular phone services, and so on.

Figure 4:
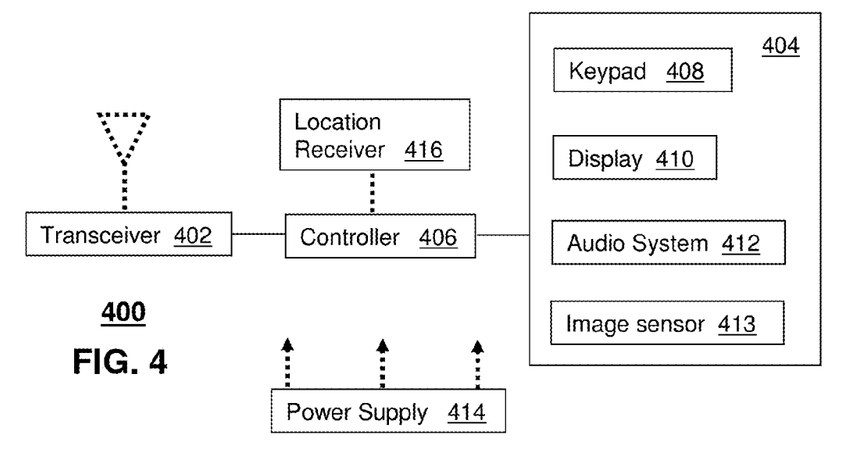
FIG. 4 depicts an illustrative embodiment of a communication device utilized in the communication systems of FIGS. 1-2.

FIG. 4 depicts an exemplary embodiment of a communication device 400. Communication device 400 can serve in whole or in part as an illustrative embodiment of the communication devices of FIGS. 1-2. The communication device 400 can comprise a wireline and/or wireless transceiver 402 (herein transceiver 402), a user interface (UI) 404, a power supply 414, a location receiver 416, and a controller 406 for managing operations thereof. The transceiver 402 can support short-range or long-range wireless access technologies such as Bluetooth, WIFI™, Digital Enhanced Cordless Telecommunications (DECT), or cellular communication technologies, just to mention a few. Cellular technologies can include, for example, CDMA-1X, UMTS/HSDPA, GSM/GPRS, TDMA/EDGE, EV/DO, WiMAX, SDR, and next generation cellular wireless communication technologies as they arise. The transceiver 402 can also be adapted to support wireline access technologies such as G.hn over power lines or phone lines to support circuit-switched PSTN communications or packet-switched communications (e.g., TCPIP, VoIP, etc.).

The UI 404 can include a depressible or touch-sensitive keypad 408 with a navigation mechanism such as a roller ball, joystick, mouse, or navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric dialing keypad commonly used by phones, and/or a Qwerty keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400. In an embodiment where the display 410 is touch-sensitive, a portion or all of the keypad 408 can be presented by way of the display.

The UI 404 can also include an audio system 412 that utilizes common audio technology for conveying low volume audio (such as audio heard only in the proximity of a human ear) and high volume audio (such as speakerphone for hands free operation). The audio system 412 can further include a microphone for receiving audible signals of an end user. The audio system 412 can also be used for voice recognition applications. The UI 404 can further include an image sensor 413 such as a charged coupled device (CCD) camera for capturing still or moving images.

The power supply 414 can utilize common power management technologies such as replaceable and rechargeable batteries, supply regulation technologies, and charging system technologies for supplying energy to the components of the communication device 400 to facilitate long-range or short-range portable applications. The location receiver 416 can utilize common location technology such as a global positioning system (GPS) receiver for identifying a location of the communication device 400 based on signals generated by a constellation of GPS satellites, thereby facilitating common location services such as navigation.

The controller 406 can utilize computing technologies such as a microprocessor, a digital signal processor (DSP), and/or a video processor with associated storage memory such a Flash, ROM, RAM, SRAM, DRAM or other storage technologies.

The communication device 400 can be adapted to perform the functions of the media processor 106, the media devices 108, or the portable communication devices 116 of FIG. 1, as well as the IMS CDs 201-202 and PSTN CDs 203-205 of FIG. 2. It will be appreciated that the communication device 400 can also represent other common devices that can operate in communication systems 100-200 of FIGS. 1-2 such as a gaming console and a media player.

Figure 5:
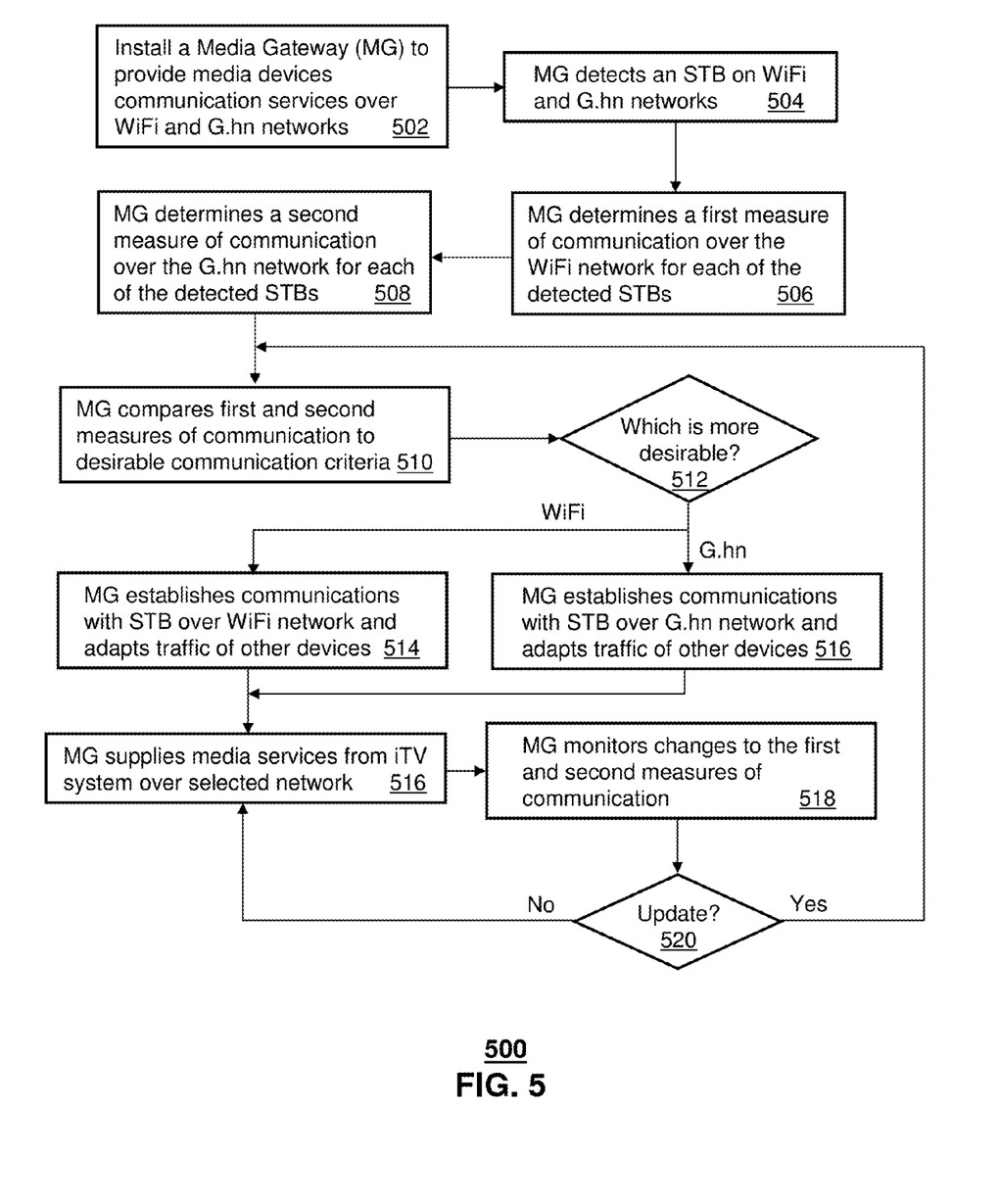
FIG. 5 depicts an illustrative embodiment of a method operating in portions of the communication systems of FIGS. 1-2.

FIG. 5 depicts an illustrative method 500 that operates in portions of the communication system of FIG. 1. Method 500 can begin with step 502 in which a media gateway (MG) such as gateway 104 is installed to provide media devices communication services over WIFI™ (such as 802.11n) and G.hn networks over a power line topology of building 102 (a phone line topology could be used instead). In one embodiment, the MG 104 can have an integrated modem (such as a VDSL modem) to access the interactive television (iTV) network of FIG. 1 and/or the IMS network of FIG. 2. The MG 104 can utilize a common Domain Name System (DNS) element to provide media devices over the WIFI™ or G.hn network temporary IP addresses from which to operate. Alternatively, the modem can be integrated in a network interface device (NID) 135 externally coupled the building 102 which is accessible by the MG 104 over a common wired interface (e.g., RJ11, coaxial, or optical link). The NID 135 can be connected to the ISP 132, cable TV 133 access network 119 over a high-speed link such as a VDSL twisted pair, or an optical link managed by a central office.

Once installed, the MG 104 can by common means detect in step 504 the presence of an STB 106 (or other media device such as media devices 108) communicatively coupled to the MG 104 by way of both the WIFI™ and G.hn networks. Once a media device such as the STB 106 is detected on each network, the MG 104 can be programmed to determine first and second measures of communication over each network in steps 506 and 508, respectively. The first measure of communication can represent for example a measure of a Quality of Service (QoS) when communicating with the STB 106 over the WIFI™ network. The QoS measure can represent a measure of packet loss rate, bit error rate, jitter, latency, signal to noise ratio, and other common measures of QoS. The first measure of communication can also measure an availability of bandwidth on the WIFI™ network based on traffic from other devices on the same network. From the bandwidth measure, the MG 104 can determine whether there is sufficient bandwidth to support the services demanded by the STB 106. Similar measures of QoS and bandwidth assessment can be determined in step 508 over the G.hn interface.

Once these measurements have been performed, the MG 104 can compare the first and second measures of communication to desirable communication criteria which can vary according to the context of media services consumed. For example, a service provider of the iTV network of FIG. 1 may dictate desirable (or minimum) QoS quality measure for distributing high definition video services to STBs 106. The desired QoS may set a ceiling on for example packet loss, bit error rates, jitter and so on. For standard definition video services, the service provider may establish a different QoS requirement. Depending on the type of media content consumed by the STB 106, the MG 104 can determine which of the WIFI™ and G.hn networks can satisfy the QoS requirements of the service provider when compared to the first and second measures of communication performed in steps 506 and 508.

If, on the other hand, the MG 104 had detected in step 504 a computer such as reference 108 of FIG. 1 requesting non-real-time communications over the Internet, the QoS criteria used in step 510 could be less demanding than the QoS requirements used for the STB 106. Had the MG 104 detected phone 109 it could have applied a QoS requirement exceeding the computer 108, but less demanding that the video requirements of the STB 106.

In addition, the MG 104 can be programmed to take into consideration the bandwidth capacity of each network. If for example that the MG 104 detects excessive traffic on one network and less in the other, the MG 104 can consider adding the STB 106 to the network with the least traffic and/or shifting traffic between networks for other devices whose QoS and capacity requirements can be satisfied on either network.

It would be apparent to an artisan with ordinary skill in the art from the above illustrations that there can be innumerable considerations to determine which network the STB 106 should use for media communications, and whether existing devices communicatively coupled to the WIFI™ and G.hn networks should be reconfigured to an unselected network. For practical reasons, these other embodiments have not been disclosed but are contemplated by the present disclosure.

Once a determination is made in step 512 by the MG 104 based on any combination of criteria illustratively set forth above, the MG 104 can coordinate with the STB 106 to establish communications on a select one of the WIFI™ or the G.hn network in steps 514 or 516. In either of these steps the MG 104 may also direct other devices identified on the chosen network to switch to an unselected network if the communication services provided to these devices on the new network would not experience a noticeable difference. For example, one or more computers detected on the WIFI™ network could be asked to switch to the G.hn network to increase capacity on the WIFI™ network which can be utilized by the STB 106. The MG 104 can determine from prior or new measurements on the WIFI™ and G.hn networks that redirecting communications from the WIFI™ network to the G.hn network would not impact or nominally impact the selected computer(s).

Once the STB 106 has established communications in one of steps 514 or 516, the MG 104 can proceed to step 516 where it can supply media services of the iTV network of FIG. 1 over the selected network. The MG 104 can periodically monitor in step 518 for changes in the first and second measures of communication to determine if a change from the selected network for the STB 106 is warranted. The MG 104 can also perform the monitoring process of step 518 for other devices communicatively coupled to the WIFI™ and G.hn networks. If the MG 104 detects in step 520 an update in the first and/or second measures of communication for the STB 106 or other devices operating in the WIFI™ or G.hn networks, the MG 104 can return to the sequence of steps beginning at step 510 to determine if a change in the configuration of any of the devices operating in either the WIFI™ or G.hn networks is appropriate.

Thus in one instance the MG 104 may determine that it is preferable for the STB 106 to operate on the WIFI™ network, and in another instance, it may determine that it is preferable for the STB 106 to operate in the G.hn network. To avoid excessive switching between networks, the MG 104 can limit switching between networks on a hourly or daily basis. The MG 104 can be programmed to perform the monitoring process described for step 518 at specific intervals such as once every minute, once every 5 minutes, or other suitable intervals.

Upon reviewing the aforementioned embodiments, it would be evident to an artisan with ordinary skill in the art that said embodiments can be modified, reduced, or enhanced without departing from the scope and spirit of the claims described below. For example, the coordination process described for the MG 104 can also be performed by the devices communicating with the MG. For example, the STB 106 can perform the measurements described in steps 506 and 508, make comparisons to preferred criteria established by the service provider or manufacturer of the STB 104, and coordinate network selections with the MG 104. When conflicting coordination requests arise, the MG 104 or the STB 106 can be assigned a priority over the other to direct the coordination process.

Other suitable modifications can be applied to the present disclosure without departing from the scope of the claims below. Accordingly, the reader is directed to the claims section for a fuller understanding of the breadth and scope of the present disclosure.

Figure 6:
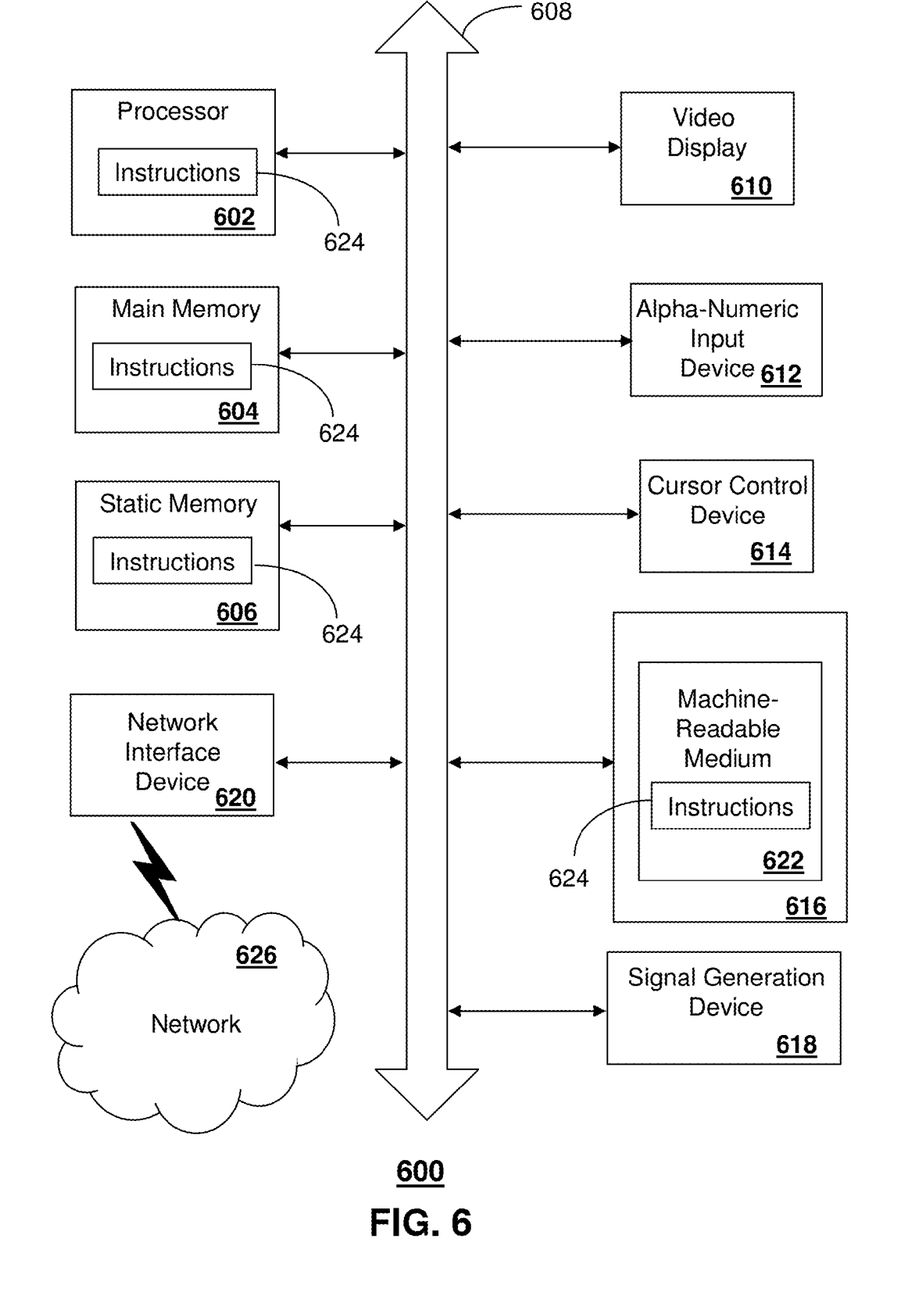
FIG. 6 is a diagrammatic representation of a machine in the form of a computer system within which a set of instructions, when executed, may cause the machine to perform any one or more of the methodologies discussed herein.

FIG. 6 depicts an exemplary diagrammatic representation of a machine in the form of a computer system 600 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 600 may include a processor 602 (e.g., a central processing unit (CPU), a graphics processing unit (GPU), or both), a main memory 604 and a static memory 606, which communicate with each other via a bus 608. The computer system 600 may further include a video display unit 610 (e.g., a liquid crystal display (LCD), a flat panel, a solid state display, or a cathode ray tube (CRT)). The computer system 600 may include an input device 612 (e.g., a keyboard), a cursor control device 614 (e.g., a mouse), a disk drive unit 616, a signal generation device 618 (e.g., a speaker or remote control) and a network interface device 620.

The disk drive unit 616 may include a machine-readable medium 622 on which is stored one or more sets of instructions (e.g., software 624) embodying any one or more of the methodologies or functions described herein, including those methods illustrated above. The instructions 624 may also reside, completely or at least partially, within the main memory 604, the static memory 606, and/or within the processor 602 during execution thereof by the computer system 600. The main memory 604 and the processor 602 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 624, or that which receives and executes instructions 624 from a propagated signal so that a device connected to a network environment 626 can send or receive voice, video or data, and to communicate over the network 626 using the instructions 624. The instructions 624 may further be transmitted or received over a network 626 via the network interface device 620.

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A media gateway, comprising:
a memory to store instructions; and
a controller coupled to the memory, wherein the controller, responsive to executing the instructions, performs operations, comprising:
  facilitating establishment of communications with a set-top box over a wireline network, wherein the media gateway supplies media services by way of a media services network communicatively coupled to the media gateway;
  facilitating establishment of communications with the set-top box over a wireless network;
  determining a first measure of communication between the media gateway and the set-top box in the wireless network for supplying the media services to the set-top box;
  determining a second measure of communication between the media gateway and the set-top box in the wireline network for supplying the media services to the set-top box;
  comparing the first measure of communication and the second measure of communication to a desired quality of service established by a service provider for processing media content at the set-top box;
  determining a network preference according to the comparing of the first measure of communication and the second measure of communication to the desired quality of service;
  identifying a device communicatively coupled to the wireless network and the wireline network and communicating with the media gateway over a select one of the wireless and wireline networks;
  directing the device to redirect previously directed media communications, resulting in redirected media communications, from a selected one of the wireless and wireline networks to an unselected one of the wireless and wireline networks according to a quality of service requirement of traffic for the device;
  coordinating with the set-top box to select one of the wireline network and the wireless network according to the network preference and according to the redirected media communications;

monitoring the first and second measures of communication between the media gateway and the set-top box, and updating the network preference according to the monitoring of the first and second measures of communication;

monitoring the redirected media communications; and coordinating with the set-top box to switch from a selected one of the wireless and wireline networks to an unselected one of the wireless and wireline networks according to the network preference and the redirected media communications, wherein the switching is limited to a fixed number of switches per time period.

2. The media gateway of claim 1, wherein the media services network comprises one of an interactive internet protocol television network, an interactive cable television network, an interactive satellite television network, a voice communication network, and an internet service provider, and wherein the time period is measurable in hours of a day.

3. The media gateway of claim 2, wherein the voice communication network is from a group consisting of a public switched telephone network, a voice over internet protocol network, and an internet protocol multimedia subsystem, and wherein the time period is measurable in a number of days.

4. The media gateway of claim 1, wherein the first measure of communication is from a group consisting of a first quality of service measure and a first capacity of communication with the media gateway according to a wireless protocol, and wherein the second measure of communication is from a group consisting of a second quality of service measure and a second capacity of communication with the media gateway according to a wireline protocol.

5. The media gateway of claim 1, wherein monitoring the first and second measures of communication between the media gateway and the set-top box comprises:

monitoring the wireline and wireless networks and identifying changes in the first and second measures of communication; and detecting an update to one of the first and second measures of the communication warranting a change in the selected one of the wireline and wireless networks.

6. The media gateway of claim 1, wherein the controller, responsive to executing the instructions, performs operations comprising directing the device to redirect media communications according to a select one from a group consisting of a measurable tolerance to operate in either of the wireless and wireline networks and load balancing considerations over the wireless and wireline networks.

7. The media gateway of claim 1, wherein the wireline network comprises a select one from a group consisting of a power line network, a coaxial cable network, and a phone line network of a building, and wherein the media gateway executes a digital living network alliance protocol for exchanging media content from a group consisting of the device and a system communicatively coupled to a select one from the group consisting of the wireline network, the wireless network, and the media gateway.

8. A set-top box, comprising:

a wireline transceiver communicatively coupled to a media gateway over a wireline network, wherein the media gateway supplies media services to the set-top box by way of an interactive television network communicatively coupled to the media gateway;

a wireless transceiver communicatively coupled to the media gateway over a wireless network;

a memory to store instructions; and a controller coupled to the memory, the wireline transceiver, and the wireless transceiver, wherein the controller, responsive to executing the instructions, performs operations comprising:

determining a first measure of communication with the media gateway in the wireless network according to-one of a first quality of service measure and a first capacity of communication with the media gateway;

determining a second measure of communication with the media gateway in the wireline network according to a select one of a second quality of service measure and a second capacity of communication with the media gateway;

coordinating with the media gateway to select from a group consisting of the wireline network and the wireless network according to a comparison of the first and second measures of communication to a metric associated with media content supplied by the interactive television network;

monitoring the first and second measures of communication between the media gateway and the set-top box, and updating a network preference according to the monitoring of the first and second measures of communication; and switching the set-top box from a selected one of the wireless and wireline networks to an unselected one of the wireless and wireline networks according to the network preference and a redirecting of media communications by the media gateway from the selected one of the wireless and wireline networks to the unselected one of the wireless and wireline networks according to a quality of service requirement of traffic for the interactive television network, wherein the switching is limited to a fixed number of switches per time period, and wherein the redirecting of the media communications by the media gateway comprises identifying a device other than the set-top box communicatively coupled to the wireless network and the wireline network and communicating with the media gateway over a select one of the wireless and wireline networks, and directing the device to redirect previously directed media communications from the selected one of the wireless and wireline networks to the unselected one of the wireless and wireline networks, according to a quality of service requirement of traffic for the device.

9. The set-top box of claim 8, wherein monitoring the first and second measures of communication between the media gateway and the set-top box comprises:

monitoring the wireline and wireless networks and identifying changes in the first and second measures of communication;

detecting an update to one from the group consisting of the first and second measures of the communication warranting a change in the selected one from the group consisting of the wireline and wireless networks; and coordinating with the media gateway to change to an opposite one of the selected one from the group consisting of the wireline network and the wireless network for delivery of media content from the interactive television network.

10. The set-top box of claim 9, wherein the controller, responsive to executing the instructions, performs operations comprising comparing the first and second measures of communication to the metric to determine that the change in the selected one from the group consisting of the wireline and wireless networks is warranted.

11. The set-top box of claim 10, wherein the metric corresponds to one from the group consisting of a metric of quality of service, a metric of capacity, and a load balancing metric.

12. The set-top box of claim 8, wherein the wireline network comprises a select one from a group consisting of a power line network, a coaxial cable network, and a phone line network of a building and wherein the time period is measurable in hours of a day.

13. The set-top box of claim 8, wherein the interactive television network comprises one from the group consisting of an interactive internet protocol television network, an interactive cable television network, and an interactive satellite television network, and wherein the time period is measurable in a number of days.

14. The set-top box of claim 8, wherein the media gateway further supplies media services by way of one from the group consisting of a voice communication network and an internet service provider, and wherein the voice communication network corresponds to one from the group consisting of a public switched telephone network, a voice over internet protocol network, and an internet protocol multimedia subsystem.

15. The set-top box of claim 8, wherein the set-top box executes a digital living network alliance protocol for exchanging media content with one from the group consisting of a device and a system of the interactive television network communicatively coupled to one from the group consisting of the wireline network, the wireless network, and the media gateway.

16. The set-top box of claim 8, wherein the media services comprise one from the group consisting of audio services, image services, and combinations thereof.

17. A non-transitory machine-readable storage medium, comprising machine-readable instructions, which when executed by a processor of a media gateway, causes the processor to perform operations comprising:
facilitating establishment of communications with a set-top box over a wireline network, wherein the media gateway supplies media services by way of a media services network communicatively coupled to the media gateway;
facilitating establishment of communications with the set-top box over a wireless network;
determining a first measure of communication between the media gateway and the set-top box in the wireless network for supplying the media services to the set-top box;
determining a second measure of communication between the media gateway and the set-top box in the wireline network for supplying the media services to the set-top box;
comparing the first measure of communication and the second measure of communication to a desired quality of service established by a service provider for processing media content at the set-top box;
determining a network preference according to the comparing of the first measure of communication and the second measure of communication to the desired quality of service;
identifying a device communicatively coupled to the wireless network and the wireline network and communicating with the media gateway over a select one of the wireless and wireline networks;
directing the device to redirect previously directed media communications from a selected one of the wireless and wireline networks to an unselected one of the wireless and wireline networks, resulting in redirected media communications, according to a quality of service requirement of traffic for the device;
coordinating with the set-top box to select one of the wireline network and the wireless network according to the network preference and according to the redirected media communications;
monitoring the first and second measures of communication between the media gateway and the set-top box, and updating the network preference according to the monitoring of the first and second measures of communication;
monitoring the redirected media communications; and
switching the set-top box from a selected one of the wireless and wireline networks to an unselected one of the wireless and wireline networks according to the network preference and the redirected media communications, wherein the switching is limited to a fixed number of switches per time period.

18. The non-transitory storage medium of claim 17, wherein the first measure of communication corresponds to one from a group consisting of a first quality of service measure and a first capacity of communication with the media gateway, and wherein the second measure of communication corresponds to one from a group consisting of a second quality of service measure and a second capacity of communication with the media gateway.

19. The non-transitory storage medium of claim 17, monitoring of the first and second measures of communication between the media gateway and the set-top box comprises:
monitoring the wireline and wireless networks and identifying changes in the first and second measures of communication; and
detecting an update to one from the group consisting of the first and second measures of the communication warranting a change in the selected one from the group consisting of the wireline and wireless networks.

20. The non-transitory storage medium of claim 17, wherein the wireline network operates according to a wireline protocol, and wherein the time period is measurable in a number of days.

21. The non-transitory storage medium of claim 17, wherein the wireline network comprises one from a group consisting of a power line network, a coaxial cable network, and a phone line network of a building.

22. The non-transitory storage medium of claim 17, wherein the wireless network operates according to a wireless protocol and wherein the time period is measurable in hours of a day.

23. The non-transitory storage medium of claim 17, wherein the media services network comprises one from a group consisting of an interactive internet protocol television network, an interactive cable television network, an interactive satellite television network, a voice communication network, and an internet service provider, and wherein the voice communication network corresponds to one from a group consisting of a public switched telephone network, a voice over internet protocol network, and an internet protocol multimedia subsystem.

24. The non-transitory storage medium of claim 17, wherein the machine-readable storage medium operates in a media gateway and wherein the set-top box executes a digital living network alliance protocol for exchanging media content from the group consisting of the device and a system communicatively coupled to one from the group consisting of the wireline network, the wireless network, and the media gateway.

25. The non-transitory storage medium of claim 17, wherein the media services comprise one from the group consisting of audio services, image services, and combinations thereof.

* * * * *